United States Patent

Inoue et al.

Patent Number: 5,254,617
Date of Patent: Oct. 19, 1993

[54] RESIN COMPOSITION FOR PRODUCING A FILM AND METHOD FOR PRODUCING A FILM BY USING THE SAME

[75] Inventors: Hiroshi Inoue; Toshihiro Nishimura; Takashi Matsunaga, all of Chiba, Japan

[73] Assignee: Mitsui Petrochemical Industries, Ltd., Tokyo, Japan

[21] Appl. No.: 689,283

[22] PCT Filed: Nov. 15, 1990

[86] PCT No.: PCT/JP90/01485
§ 371 Date: Jun. 17, 1991
§ 102(e) Date: Jun. 17, 1991

[87] PCT Pub. No.: WO91/07461
PCT Pub. Date: May 30, 1991

[30] Foreign Application Priority Data

Nov. 16, 1989 [JP] Japan .................................. 1-298564

[51] Int. Cl.$^5$ .......................... C08J 5/18; C08L 23/20; B32B 27/08
[52] U.S. Cl. .................................... 524/433; 524/451; 525/240; 428/216; 428/218; 428/516; 264/211.12; 264/230
[58] Field of Search ................ 524/433, 451; 525/240; 264/211.12, 230; 428/216, 218, 516

[56] References Cited

U.S. PATENT DOCUMENTS

| | | | |
|---|---|---|---|
| 4,234,469 | 11/1980 | Ohta et al. | 525/240 |
| 4,354,004 | 10/1982 | Hughes et al. | 525/240 |
| 4,828,906 | 5/1989 | Nishimura et al. | 525/240 |
| 4,866,117 | 9/1989 | Egashira et al. | 524/433 |

FOREIGN PATENT DOCUMENTS

| | | | |
|---|---|---|---|
| 2034019 | 7/1970 | Fed. Rep. of Germany | 525/240 |
| 2208265 | 2/1971 | Fed. Rep. of Germany | 525/240 |

Primary Examiner—Paul R. Michl
Assistant Examiner—Olga Asinovsky
Attorney, Agent, or Firm—Nixon & Vanderhye

[57] ABSTRACT

A resin composition for producing a film is provided. The composition comprises (A) a high-density polyethylene having predetermined melt flow rate, density and melt tension, (B) a propylene-based polymer having predetermined melt flow rate, (C) talc, (D) CaO and/or MgO, and (E) a surface active agent. The resin compositions is readily formable into a film having excellent strength and water resistance as well as paper-like texture and rigidity. A method for producing a film by blown-film extrusion from such a resin composition is also provided. In this method, both ratio of diameter of the resulting bubble to minimum diameter of the bubble and ratio of length in machine direction of the bubble with predetermined diameter to the die diameter are adjusted to fall within predetermined ranges.

5 Claims, 2 Drawing Sheets

F I G. 1
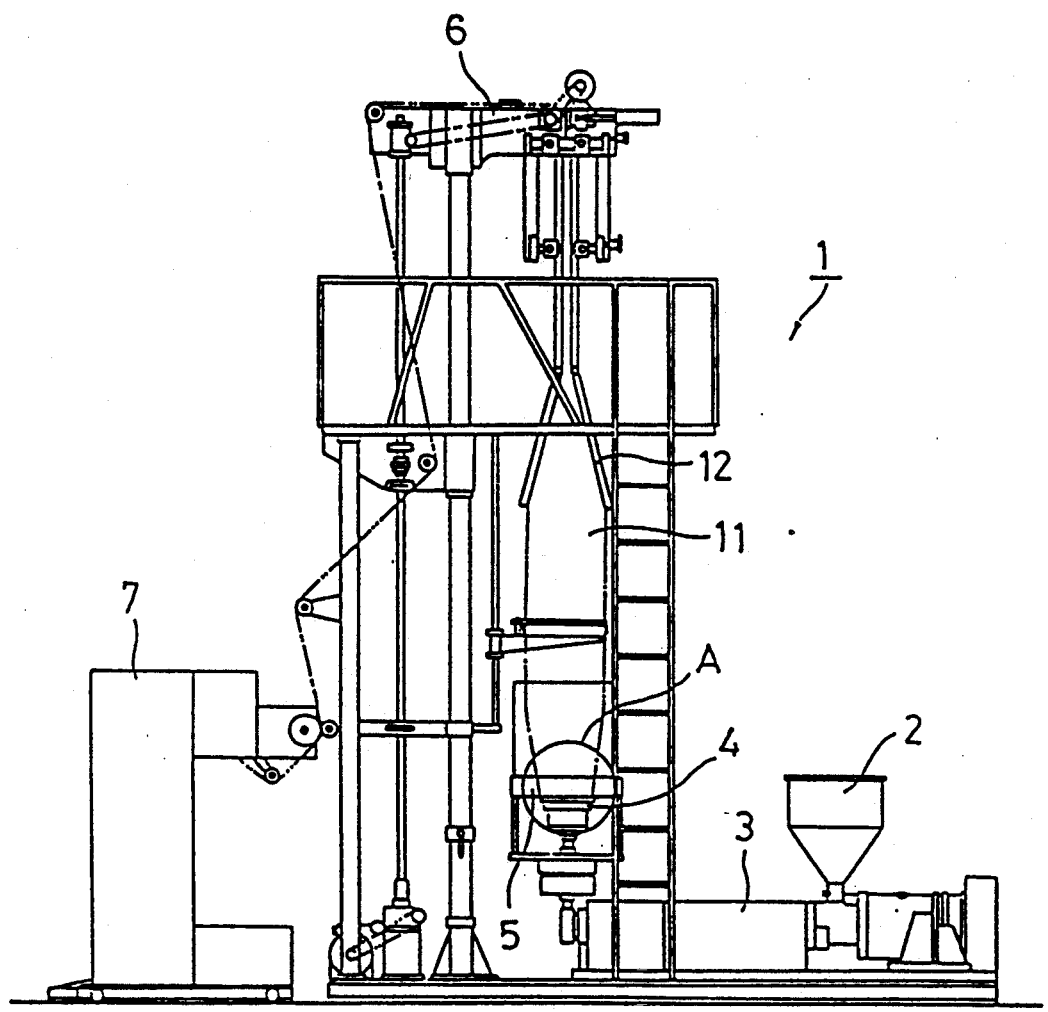

RESIN COMPOSITION FOR PRODUCING A FILM AND METHOD FOR PRODUCING A FILM BY USING THE SAME

TECHNICAL FIELD

This invention is directed to a resin composition for producing a film, and a method for producing a film by using said resin composition. More particularly, this invention relates to a resin composition which may be formed into a film having excellent strength, water resistance and folding properties as well as texture and rigidity comparable to those of papers. This invention is also directed to a method for producing a film from said resin composition.

BACKGROUND ART

Papers, polyethylene films, polypropylene films and other polyolefin films have been used as wrapping materials Recently, polyolefins, in particular, are often used for wrapping purposes since they have excellent formability, and the films formed have excellent strength and water resistance.

Papers, however, are still used for wrapping high-class commodities since paper-wrapped commodities give higher-grade appearance. In view of such a situation, there is a demand for a paper like polyolefin film provided with excellent strength, water resistance and formability comparable to those of polyolefin films as well as texture and rigidity comparable to those of papers. For example, there is proposed in Japanese Patent Publication No. 46-41463, a paper-like polyolefin film comprising a high-density polyethylene and/or a polypropylene having calcium carbonate, talc, and other inorganic fillers added thereto.

This prior art paper-like polyolefin film was inferior in its strength, rigidity and formability compared to polyolefin films in spite of its paper-like appearance and texture.

An object of the present invention is to provide a resin composition which may be formed into a film having excellent strength, water resistance and formability inherent to the polyolefin films together with texture and rigidity comparable to those of papers. Another object of the present invention is to provide a preferable method for producing a film by using said resin composition.

DISCLOSURE OF THE INVENTION

To obviate the problems as described above, there is provided by the present invention a resin composition for producing a film comprising (A) 35 to 87 parts by weight of a high-density polyethylene having melt flow rate at 190° C. of 0.01 to 0.1 g/10 min., density of 0.938 to 0.965 g/cm³, and melt tension of at least 10 g;

(B) 3 to 25 parts by weight of a propylene-based polymer having melt flow rate at 230° C. of 0.3 to 10 g/10 min.;

(C) 10 to 45 parts by weight of talc;

(D) 1 to 10 parts by weight per 100 parts by weight of (A), (B) and (C) of CaO and/or MgO; and (E) 0.05 to 1 part by weight per 100 parts by weight of (A), (B) and (C) of a surface active agent;

wherein (C)/(B) is from 2 to 4.

According to the present invention, there is also provided a method for suitably producing a film from said resin composition wherein the film is produced by blown-film extrusion (inflation technique). This method is characterized in that the extrusion is carried out under the conditions wherein ratio $R_A/R_E$ of $R_A$, which is diameter of the bubble farther than the frost line, to $R_E$, which is minimum diameter of the bubble between the dye outlet and the frost line, is between 2 and 6, and wherein C, which is length of the bubble in machine direction between the dye outlet and the frost line of the bubble wherein the bubble has a diameter of from 0.8 to 1.5 folds of the dye diameter, is 2 to 15 times larger than $R_D$, which is the die diameter.

BRIEF DESCRIPTION OF THE DRAWINGS

FIG. 1 is a schematic view illustrating the process of the present invention wherein a film is produced by blown-film extrusion using the resin composition of the present invention.

BEST MODE FOR CARRYING OUT THE INVENTION

Figure 2:
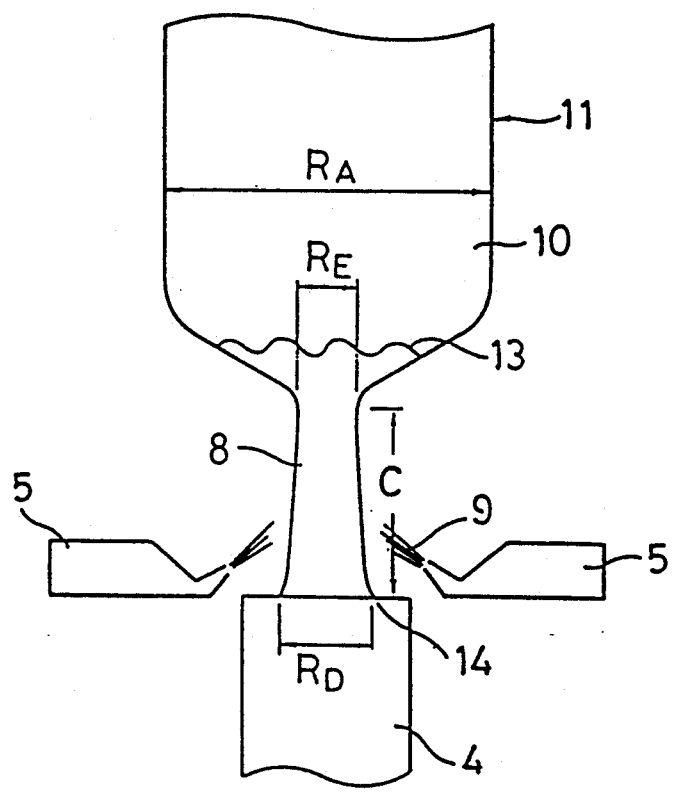
FIG. 2 is an enlarged schematic view illustrating the characteristic features of the present process.

The present invention is hereinafter described in detail.

The high-density polyethylene, which may be used for component (A) of the resin composition for producing a film of the present invention (hereinafter simply referred to as component (A)), has a melt flow rate at 190° C. of 0.01 to 0.1 g/10 min., preferably 0.02 to 0.07 g/10 min., and more preferably 0.02 to 0.05 g/10 min., a density of 0.938 to 0.965 g/cm³, and preferably 0.945 to 0.960 g/cm³, and a melt tension of at least 10 g, and preferably at least 15 g. The melt tension used herein is a tension of the resin in its molten state, and is measured with a melt tension tester manufactured by Toyo Seiki K. K. under the following conditions:

nozzle used: L=8.000 mm, D=2.095 mm
temperature: 190° C.
pull rate: 2 meter/min., and
extrusion rate: 15 mm/min.

When component (A) has a melt flow rate at 190° C. of below 0.01 g/10 min., the resulting resin composition will be difficult to form by extrusion. When component (A) has a melt flow rate at 190° C. in excess of 0.1 g/10 min., the resulting composition can not be extruded into a film of sufficient strength. The melt flow rate was measured in accordance with ASTM 1238. When component (A) has a density of below 0.938 g/cm³, the resulting resin composition can not be extruded into a film having a sufficient rigidity. When component (A) has a density in excess of 0.965 g/cm³, the resulting resin composition can not be formed into a film of sufficient strength. When component (A) has a melt tension of at least 10 g, and in particular, at least 15 g, the bubble will be stable during the blown extrusion of the resulting resin composition, and the film produced will have excellent impact resistance, tear resistance and rigidity owing to the higher degree of molecular orientation.

In the resin composition of the present invention, 35 to 87 parts by weight, and preferably 45 to 85 parts by weight of component (A) is included. When less than 35 parts by weight of component (A) is contained in the resin composition, the resin composition can not be formed into a film of sufficient strength and the bubble formed during the blown extrusion of the resin composition will be unstable. When more than 87 parts by weight of component (A) is included in the resin composition, the film formed from the resin composition will have an insufficient rigidity.

The propylene-based polymer, which is component (B) of the resin composition of the present invention (hereinafter simply referred to as component (B)), may be a homopolymer of propylene, or a random or block copolymer of propylene and a monomer which is copolymerizable with the propylene. Component (B) may preferably a homopolymer of propylene. The monomers which are copolymerizable with said propylene include ethylene, butene, and the like. The copolymer may preferably contain up to 10 mole % of the propylene-copolymerizable monomer.

Component (B) has a melt flow rate at 230° C. of 0.3 to 10 g/10 min., and preferably 1 to 7 g/10 min. When component (B) has a melt flow rate at 230° C. of less than 0.3 g/10 min., dispersion of component (B) in the resulting resin composition will be insufficient, and the resin composition will be difficult to form by extrusion. When component (B) has a melt flow rate at 230° C. in excess of 10 g/10 min., the resulting film will have an insufficient strength. The melt flow rate is measured in accordance with ASTM D 1238.

In the resin composition of the present invention, 3 to 25 parts by weight, and preferably, 5 to 25 parts by weight of component (B) is included. When less than 3 parts by weight of component (B) is included in the resin composition, the resin composition will be difficult to form into a film of sufficient rigidity. When over 25 parts by weight of component (B) is included in the resin composition, the resin composition can not be formed into a film of a sufficient strength.

The talc, which is component (C) of the resin composition of the present invention (hereinafter simply referred to as component (C)), is not limited to any particular type, and may be any talc which is generally used in the resin composition, for example, the one having an average particle size of 1.5 to 4.5 μm, oil absorption of 38 to 52 cc/100 g, and water content of up to 0.3%.

In the resin composition of the present invention, 10 to 45 parts by weight, and preferably 10 to 40 parts by weight of component (C) is included. When less than 10 parts by weight of component (C) is included in the resin composition, the resin composition will be difficult to form into a film of sufficient rigidity having a good paper-like appearance. When more than 45 parts by weight of component (C) is included in the resin composition, the resulting resin composition will be difficult to form into a film, and the film formed will have an insufficient strength.

In the resin composition of the present invention, ratio of component (C)/component (B) is adjusted to 2 to 4, and preferably 2.5 to 3.5. When the ratio of component (C)/component (B) is less than 2, the resulting composition will be difficult to form into a film having a good paper-like appearance. When the ratio of component (C)/component (B) is more than 4, the resulting resin composition will be difficult to form into a film having excellent impact strength and tear strength.

The CaO and/or MgO, which is component (D) of the resin composition of the present invention (hereinafter simply referred to component (D)), is not limited to any particular type, and may be the one which is suitable for blending in resin compositions.

In the resin composition of the present invention, 1 to 10 parts by weight, and preferably 1.5 to 8 parts by weight of component (D) is included per 100 parts by weight of said components (A), (B) and (C). When the content of component (D) is less than 1 part by weight per 100 parts by weight of components (A), (B) and (C), the resulting resin composition will be difficult to form into a film, and the film formed may have pores due to foaming. No further effects are achieved by blending over 10 parts by weights of component (D).

The surface active agent, which is component (E) of the resin composition of the present invention (hereinafter simply referred to as component (E)), is not limited to any particular type, and may be selected from nonionic, anionic, cationic, and ampholytic surface active agents.

Typical nonionic surface active agents include N,N-bis(2-hydroxyethyl)alkylamines, fatty acid esters of polyoxyethylene alkylamines, glycerol esters of fatty acid, sorbitane fatty acid ester, polyoxyethylenesorbitane fatty acid esters, aliphatic alcohol ethers of polyoxyethylene, polyoxyethylene alkylphenylethers, fatty acid esters of polyethyleneglycol, and the like.

Typical anionic surface active agents include alkylsulfonates, alkylbenzenesulfonates, alkylsulfates, alkylphosphates, and the like.

Typical cationic surface active agents include tetraalkylammonium salts, trialkylbenzylammonium salts, and the like.

Typical ampholytic surface active agents include alkylbetaine-based surface active agents, imidazoline-type surface active agents, and the like.

In the present invention, the surface active agents as mentioned above may be used alone or in combination of two or more as component (E).

Among the surface active agents mentioned above, nonionic glycerine fatty acid esters are particularly preferred because of their ability to improve the dispersion of components (C) and (D) and other optionally added additives in the resulting resin composition, and their ability to improve formability and other physical properties of the resulting resin composition.

In the resin composition of the present invention, 0.05 to 1 part by weight, and preferably 0.1 to 0.8 part by weight of component (E) is included per 100 parts by weight of components (A), (B) and (C). When component (E) is included less than 0.05 part by weight per 100 parts by weight of components (A), (B) and (C), components (C) and (D) and other additives will not be fully dispersed in the resin composition. When more than 1 part by weight of component (E) is included in the resin composition, component (E) may bleed out onto the surface of the film formed to injure the appearance of the film.

The resin composition of the present invention may also include, in addition to the above-described components (A), (B), (C), (D) and (E), various additives generally used in such a resin composition, for example, phenolic and phosphorus-based heat stabilizers; and colorants such as inorganic pigments such as titanium oxide and organic pigment. These additives may be added alone or in combination of two or more as desired.

The resin composition for producing a film of the present invention may be prepared by simultaneously mixing predetermined amounts of the above-described components (A), (B), (C), (D) and (E) and optionally added additives, and kneading the resulting mixture in its molten state in a twin-screw extruder, Banbury mixer or the like at 180° to 250° C. Alternatively, components (C), (D) and (E) may be preliminarily mixed with one member selected from components (A) and (B) to form mixture (F), and then, at the time of film formation, mix the mixture (F) with the other member of components (A) and (B) to form the film.

The resin composition for producing a film of the present invention may be used for either an extrusion of a blown film or an extrusion from a T-die. The resin composition is particularly suitable for an extrusion of a blown film.

According to the present invention, there is also provided a method for suitably producing a blown film by extruding the resin composition under the conditions satisfying the following relations:

$$2 \leq R_A/R_E \leq 6 \quad (1), \text{ and}$$

$$2 \leq C/R_D \leq 15 \quad (2)$$

provided that $R_A$ is diameter of the bubble farther than the frost line;

$R_E$ is minimum diameter of the bubble between the dye outlet and the frost line;

C is length of the bubble in machine direction between the dye outlet and the frost line of the bubble, wherein the bubble has a diameter of from 0.8 to 1.5 folds of the dye diameter; and $R_D$ is diameter of the dye.

This method is carried out, for example, in a blown-film extrusion system shown in FIG. 1. Referring to FIG. 1, the blown-film extrusion system 1 comprises a hopper 2 for feeding the resin composition, an extruder 3 for melting and homogenizing the resin composition fed from the hopper, cylindrical dye 4 for extruding the molten resin composition in tubular shape, air ring for cooling 5 for cooling the extruded resin composition by spraying air onto the extruded resin composition, a puller 6 for hauling off the cooled film, and a winder 7 for winding up the film produced.

In this system, the resin composition is fed to the extruder 3 from the hopper 2, and is molten to become homogenized in a cylinder with the heat applied from the cylinder wall and the frictional heat generated by the screw. At the same time, the molten resin composition is transferred to the dye 4 by the screw. As shown in FIG. 2, which is an enlarged view of portion A in FIG. 1, the resin composition is primarily shaped in the cylindrical dye 4 to form a bubble 8, and is extruded from a narrow slit. The bubble 8 is immediately inflated with the air blown into the bubble 8 through the dye, while the bubble 8 is cooled and solidified with the air sprayed onto the exterior of the bubble from the cooling air ring 5 to secondarily shape the bubble 8 and form bubble 10. The thus formed cooled film 11 is then introduced between guide plates 12, pulled upward by the puller 6, and then wound up by the winder 7.

In the blown film extrusion as described above, as shown in FIG. 2, $R_A$ denotes diameter of the bubble 10 farther than frost line (whitening point) 13 where the resin composition extruded from the cylindrical die 4 is cooled to exhibit a frosty appearance, $R_E$ denotes minimum diameter of the bubble 8 between the outlet 14 of the die 4 and the frost line 13, $R_D$ denotes diameter of the dye, and C denotes length of the bubble in machine direction between the dye outlet 14 and the frost line 13 of the bubble 8, wherein the bubble 8 has a diameter of from 0.8 to 1.5 folds of the dye diameter $R_D$. The film extrusion of the present invention is characterized in that the extrusion is carried out by adjusting the ratio of $R_A/R_E$ to 2 to 6, preferably 3 to 5, and ratio of $C/R_D$ to 2 to 15, preferably 5 to 10.

Such an adjustment is effected through adjustment of heating temperature in the extruder, pull rate of the film, and air flow of the air-cooling ring 5 to satisfy the following relations:

$$2 \leq R_A/R_E \leq 6 \quad (1), \text{ and}$$

$$2 \leq C/R_D 15 \quad (2).$$

When $R_A/R_E$ of relation (1) is less than 2, the resin composition would be difficult to form into a film having sufficient impact strength and tear strength. When $R_A/R_E$ is more than 6, the resin composition would be difficult to form into a film due to poor bubble stability during the film formation to result in inferior productivity.

When $C/R_D$ of relation (2) is less than 2, the resin composition would be difficult to form into a film having sufficient impact strength and tear strength. When $C/R_D$ is more than 15, the resin composition would be difficult to form into a film due to poor bubble stability during the film formation, leading to inferior productivity.

The resin composition is heated in the extruder typically to a temperature of about 180° to 230° C., and preferably to about 190° to 220° C.

The pull rate of the film is typically about 10 to about 70 m/min.

The extruder, the die, the puller and the winder employed are not limited to any particular types, and may be any conventionally used ones.

Although the present method has been described with regard to an film extrusion wherein the film is pulled upward as shown in FIG. 1, it is to be understood that the present process is not limited to the one shown in FIG. 1, but also encompasses a film extrusion wherein the film is pulled in horizontal or downward direction.

The resin composition of the present invention as described above may be extruded into a film having appearance, texture, and fold properties comparable to those of papers, as well as an excellent strength. The extrusion method of the present invention as described above has enabled a production of a film from said resin composition at a high productivity equivalent to that of the conventional polyolefin films.

The film produced in accordance with the present method by using the resin composition of the present invention has various excellent properties as mentioned above, and therefore, may be suitably used as printing papers for shopping bags, maps, and posters, in which good weatherability is required.

EXAMPLES

The present invention is more illustratively described by referring to Examples and Comparative Examples of the invention.

EXAMPLES 1-4 AND COMPARATIVE EXAMPLES 1-8

In the Examples and Comparative Examples, the components as shown in Table 1 were introduced into 20 liter Henschel mixer, and mixed for 3 minutes. The mixture was melt kneaded at 180° to 200° C. in CIM65φ (a twin-screw machine manufactured by Nihon Seikosho K. K.) and pellets were produced in a short-barrel extruder of 65φ. The talc employed had an average particle size of 3.0 μm, an oil absorption of 41 cc/100g, and a water content of 0.1%. The surface active agent used was stearic acid monoglyceride. Melt tension of component (A) was measured with a melt tension tester manufactured by Toyo Seiki K. K. under the following conditions:

nozzle used: L=8.000 mm, D=2.095 mm,
temperature: 190° C.,
pull rate: 2 meter/min., and
extrusion rate: 15 mm/min.

The resulting pellets were supplied to a blown film extruder of 50φ (Modernderser 50 mm manufactured by Modern Machinery K. K., screw, ratio of screw length/screw diameter: 24, compression ratio: 2.0, die diameter $R_D$: 100 mm, and lip width: 1 mm), and films of 40 μm thick were produced at a temperature of 200° C., a pull rate of 20 m/min. under the following conditions.

Conditions for forming films (i) Examples 1-4, and Comparative Examples 1, 4 and 4-7
$R_A/R_E$=3.0, C=1000 mm, C/$R_D$=10
(ii) Comparative Example 3
$R_A/R_E$=1.5, C=100 mm, C/$R_D$=1

The resulting films were evaluated for their impact strength and Elmendorf tear strength in accordance with ASTM D 3420 and JIS Z1702, respectively. The resulting films were also evaluated for their texture and rigidity. Formability during the blown film extrusion was also evaluated. The texture, rigidity, and formability were evaluated in accordance with the criteria described below. For a comparison purpose, a Kraft paper was also evaluated for its impact strength and Elmendorf tear strength as well as its texture and rigidity (Comparative Example 8). The results are shown in Table 1.

Texture and rigidity

O: texture, rigidity and preservability of fold line comparable to that of papers.

Δ: texture and rigidity between that of papers and polyolefin films.

X: no paper-like texture or rigidity.

Formability

O: formability comparable to that of conventional polyolefin films

Δ: formability somewhat inferior to that of conventional polyolefin films although capable of forming a film.

X: bubble is unstable during the extrusion to result in bubble shaking and bubble break.

TABLE 1

|     |     | E1 | E2 | E3 | E4 | CE1 | CE2 |
|-----|-----|----|----|----|----|-----|-----|
| (A) | High density polyethylene MFR @ 190° C., g/10 min. | 0.025 | 0.025 | 0.060 | 0.045 | 0.025 | 0.025 |
|     | Density, g/cc | 0.950 | 0.950 | 0.957 | 0.955 | 0.950 | 0.950 |
|     | Melt tension @ 190° C., g | 23 | 23 | 18 | 20 | 23 | 23 |
| (B) | Polypropylene MFR @ 230° C., g/10 min. | 4.2 | 4.2 | 0.6 | 4.2 | — | 4.2 |
| (C) | Inorganic filler | talc | talc | talc | talc | — | talc |
| (D) | CaO/MgO | CaO | CaO | CaO | MgO | — | — |
| (E) | Surfactant | * | * | * | * | — | — |
|     | (A)/(B)/(C), pbw | 80/5/15 | 50/15/35 | 80/5/15 | 50/15/35 | 100/0/0 | 50/15/35 |
|     | (D)/(E), pbw | 2/0.2 | 2/0.5 | 2/0.2 | 2/0.5 | 0/0 | 0/0 |
| Extrusion |  |  |  |  |  |  |  |
| $R_A/R_E$ |  | 3.0 | 3.0 | 3.0 | 3.0 | 3.0 | 3.0 |
| C/$R_D$ |  | 10 | 10 | 10 | 10 | 10 | 10 |
| Film formed |  |  |  |  |  |  |  |
| Impact strength, kg·cm/cm |  | 2200 | 1050 | 1100 | 1010 | 4400 | *** |
| Elmendorf tear strength, kg/cm, MD/TD |  | 120/150 | 10/55 | 12/74 | 10/57 | 10/170 |  |
| Paper-like texture |  | o | o | o | o | x |  |
| Rigidity |  | o | o | o | o | Δ |  |
| Formability |  | o | o | o | o | o | Δ |

|     |     | CE3 | CE4 | CE5 | CE6 | CE7 | CE8** |
|-----|-----|-----|-----|-----|-----|-----|-------|
| (A) | High density polyethylene MFR @ 190° C., g/10 min. | 0.025 | 0.025 | 0.025 | 0.6 | 0.025 | — |
|     | Density, g/cc | 0.950 | 0.950 | 0.950 | 0.957 | 0.950 | — |
|     | Melt tension @ 190° C., g | 23 | 23 | 23 | 7.2 | 23 | — |
| (B) | Polypropylene MFR @ 230° C., g/10 min. | 4.2 | 4.2 | 4.2 | 4.2 | 15.3 | — |
| (C) | Inorganic filler | talc | CaCO$_3$ | clay | talc | talc | — |
| (D) | CaO/MgO | CaO | CaO | CaO | CaO | CaO | — |
| (E) | Surfactant | * | * | * | * | * | — |
|     | (A)/(B)/(C), pbw | 80/5/15 | 80/5/15 | 80/5/15 | 80/5/15 | 20/30/50 | — |
|     | (D)/(E), pbw | 2/0.2 | 2/0.2 | 2/0.2 | 2/0.2 | 2/0.2 | — |
| Extrusion |  |  |  |  |  |  |  |
| $R_A/R_E$ |  | 1.5 | 3.0 | 3.0 | 3.0 | 3.0 | — |
| C/$R_D$ |  | 1 | 10 | 10 | 10 | 10 | — |
| Film formed |  |  |  |  |  |  |  |
| Impact strength, kg·cm/cm |  | 270 | 2100 | 1800 | **** | 310 | 100 |
| Elmendorf tear strength, kg/cm, MD/TD |  | 4/180 | 11/145 | 10/132 |  | 8/21 | 7/8 |
| Paper-like texture |  | o | Δ | Δ–o |  | o | o |
| Rigidity |  | o | o–x | Δ |  | o | o |

TABLE 1-continued

| Formability | o | o | o | x | x | — |

E: Example, CE: Comparative Example, MFR: melt flow rate.
*stearic acid monoglyceride. **craft paper.
***foaming and insufficient dispersion of talc were observed.
****the film could not be formed since bubble was unstable.

EXAMPLES 5-6 AND COMPARATIVE EXAMPLES 9-17

The procedure of Example 1 was repeated except that the components as shown in Table 2 were used to produce the pellets. The pellets were formed into films by using the same blown film extruder as Example 1 under the conditions described below. The talc employed was the same as Example 1.

Conditions for forming films (i) Example 5, and Comparative Examples 9-14
The same as Example 1
(iii) Comparative Example 15
$R_A/R_E = 1.5$, $C = 1000$ mm, $C/R_D = 10$
(iv) Comparative Example 16
$R_A/R_E = 3.0$, $C = 100$ mm, $C/R_D = 1$
(v) Example 6
$R_A/R_E = 3.0$, $C = 500$ mm, $C/R_D = 5$
Comparative Example 17
$R_A/R_E = 3.0$, $C = 2000$ mm, $C/R_D = 20$
(vii) Example 7
$R_A/R_E = 5.0$, $C = 1000$ mm, $C/R_D = 10$ The resulting films were evaluated for their physical properties as in Example 1. The results are shown in Table 2.

TABLE 2

|  |  | E5 | E6 | E7 | CE9 | CE10 | CE11 |
|---|---|---|---|---|---|---|---|
| (A) | High density polyethylene MFR @ 190° C., g/10 min. | 0.025 | 0.025 | 0.025 | 0.025 | 0.025 | 0.025 |
|  | Density, g/cc | 0.950 | 0.950 | 0.950 | 0.950 | 0.950 | 0.950 |
|  | Melt tension @ 190° C., g | 23 | 23 | 23 | 23 | 23 | 23 |
| (B) | Polypropylene MFR @ 230° C., g/10 min. | 4.2 | 4.2 | 4.2 | 4.2 | 4.2 | 15.3 |
| (C) | Inorganic filler | talc | talc | talc | talc | talc | talc |
| (D) | CaO/MgO | CaO | CaO | CaO | CaO | CaO | CaO |
| (E) | Surfactant | * | * | * | * | — | * |
| (A)/(B)/(C), pbw |  | 50/10/40 | 80/5/15 | 80/5/15 | 20/65/15 | 50/15/35 | 50/15/35 |
| (D)/(E), pbw |  | 2/0.5 | 2/0.5 | 2/0.5 | 2/0.2 | 2/0 | 2/0.5 |
| Extrusion |  |  |  |  |  |  |  |
| $R_A/R_E$ |  | 3.0 | 3.0 | 5.0 | 3.0 | 3.0 | 3.0 |
| $C/R_D$ |  | 10 | 5 | 10 | 10 | 10 | 10 |
| Film formed |  |  | — |  |  |  |  |
| Impact strength, kg · cm/cm |  | 1000 | 1500 | 2000 | 210 | ** | 650 |
| Elmendorf tear strength, kg/cm, MD/TD |  | 11/59 | 13/138 | 13/138 | 5/10 |  | 10/350 |
| Paper-like texture |  | o | o | o | Δ | Δ | o |
| Rigidity |  | o | o | o | o | o | o |
| Formability |  | o | o | o | x | Δ | Δ |

|  |  | CE12 | CE13 | CE14 | CE15 | CE16 | CE17 |
|---|---|---|---|---|---|---|---|
| (A) | High density polyethylene MFR @ 190° C., g/10 min. | 0.010 | 0.025 | 0.025 | 0.025 | 0.025 | 0.025 |
|  | Density, g/cc | 0.935 | 0.950 | 0.950 | 0.950 | 0.950 | 0.950 |
|  | Melt tension @ 190° C., g | 10 | 23 | 23 | 23 | 23 | 23 |
| (B) | Polypropylene MFR @ 230° C., g/10 min. | 4.2 | 4.2 | 4.2 | 4.2 | 4.2 | 4.2 |
| (C) | Inorganic filler | talc | talc | talc | talc | talc | talc |
| (D) | CaO/MgO | CaO | CaO | CaO | CaO | CaO | CaO |
| (E) | Surfactant | * | * | * | * | * | * |
| (A)/(B)/(C), pbw |  | 80/5/15 | 50/40/10 | 50/4/46 | 80/5/15 | 80/5/15 | 80/5/15 |
| (D)/(E), pbw |  | 2/0.5 | 2/0.5 | 2/0.5 | 2/0.5 | 2/0.5 | 2/0.5 |
| Extrusion |  |  |  |  |  |  |  |
| $R_A/R_E$ |  | 3.0 | 3.0 | 3.0 | 1.5 | 3.0 | 3.0 |
| $C/R_D$ |  | 10 | 10 | 10 | 10 | 1 | 20 |
| Film formed |  |  |  |  |  |  |  |
| Impact strength, kg · cm/cm |  | 990 | 530 | 420 | 310 | 630 | *** |
| Elmendorf tear strength, kg/cm, MD/TD |  | 13/135 | 7/25 | 7/31 | 5/190 | 11/38 |  |
| Paper-like texture |  | Δ | x | Δ | Δ | o | o |
| Rigidity |  | x | o | o | o | o | o |
| Formability |  | Δ | Δ | Δ | o | o | o |

E: Example, CE: Comparative Example, MFR: melt flow rate.
*stearic acid monoglyceride. **talc was insufficiently dispersed.
***bubble was unstable.

The resin composition for producing a film in accordance with the present invention exhibits an excellent film formability during its blown film extrusion, and the film formed from the present resin composition has an excellent strength and water resistance as well as a texture, rigidity and fold maintenance comparable to those of papers.

The method of the present invention is preferable for producing a film from said resin composition.

We claim:

1. A resin composition for producing a film by blow-film extrusion consisting essentially of
   (A) 35 to 87 parts by weight of a high-density polyethylene having melt flow rate at 190° C. of 0.01 to 0.1 g/10 min., density of 0.938 to 0.965 g/cm$^3$, and melt tension of at least 10 g;
   (B) 3 to 25 parts by weight of a propylene-based polymer having melt flow rate at 230° C. of 0.3 to 10 g/10 min.;
   (C) 10 to 45 parts by weight of talc;
   (D) 1 to 10 parts by weight per 100 parts by weight of (A), (B) and (C) of CaO and/or MgO; and
   (E) 0.05 to 1 part by weight per 100 parts by weight of (A), (B) and (C) of a surface active agent;
   wherein (C)/(B) is from 2 to 4.

2. A method for producing a film by blown-film extrusion using the resin composition of claim 1 wherein the extrusion is carried out under the conditions satisfying the following relations:

$$2 \leq R_A/R_E \leq 6 \quad (1), \text{ and}$$

$$2 \leq C/R_D \leq 15 \quad (2)$$

provided that
   $R_A$ is diameter of the bubble farther than the frost line;
   $R_E$ is minimum diameter of the bubble between the dye outlet and the frost line;
   C is length of the bubble in machine direction between the dye outlet and the frost line of the bubble, wherein the bubble has a diameter of from 0.8 to 1.5 folds of the dye diameter; and
   $R_D$ is diameter of the dye.

3. A biaxially oriented polyolefin film having the texture, rigidity and formability comparable to paper, said film extruded from a resin composition consisting essentially of:
   (A) 35 to 87 parts by weight of a high-density polyethylene having melt flow rate at 190° C. of 0.01 to 0.1 g/10 min., density of 0.938 to 0.965 g/cm$^3$, and melt tension of at least 10 g;
   (B) 3 to 25 parts by weight of a propylene-based polymer having melt flow rate at 230° C. of 0.3 to 10 g/10 min.;
   (C) 10 to 45 parts by weight of talc;
   (D) 1 to 10 parts by weight per 100 parts by weight of (A), (B), and (C) of CaO and/or MgO; and
   (E) 0.05 to 1 part by weight per 100 parts by weight of (A), (B) and (C) of a surface active agent;
   wherein (C)/(B) is from 2 to 4.

4. The biaxially oriented polyolefin film of claim 3 having an impact strength of at least 1000 kg·cm/cm.

5. A wrapper paper made of the polyolefin fiber of claim 3.

* * * * *